United States Patent
Zhou

(10) Patent No.: US 11,647,448 B2
(45) Date of Patent: May 9, 2023

(54) METHOD FOR ENABLING SMART DEVICE TO ACCESS NETWORK, NETWORK ACCESS METHOD, APPARATUS AND SHOPPING SYSTEM

(71) Applicant: BEIJING XIAOMI MOBILE SOFTWARE CO., LTD., Beijing (CN)

(72) Inventor: Juejia Zhou, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 190 days.

(21) Appl. No.: 16/898,675

(22) Filed: Jun. 11, 2020

(65) Prior Publication Data

US 2021/0136667 A1    May 6, 2021

(30) Foreign Application Priority Data

Nov. 6, 2019  (CN) .......................... 201911078277.5

(51) Int. Cl.
| | |
|---|---|
| *H04W 48/16* | (2009.01) |
| *H04W 4/80* | (2018.01) |
| *H04W 76/11* | (2018.01) |
| *H04W 8/04* | (2009.01) |
| *H04W 12/06* | (2021.01) |
| *H04W 48/10* | (2009.01) |

(52) U.S. Cl.
CPC ............ *H04W 48/16* (2013.01); *H04W 4/80* (2018.02); *H04W 8/04* (2013.01); *H04W 12/06* (2013.01); *H04W 48/10* (2013.01); *H04W 76/11* (2018.02)

(58) Field of Classification Search
None
See application file for complete search history.

(56) References Cited

U.S. PATENT DOCUMENTS

| | | |
|---|---|---|
| 7,318,159 B2 | 1/2008 | Salmivalli |
| 8,010,083 B2 | 8/2011 | Descombes et al. |

(Continued)

FOREIGN PATENT DOCUMENTS

| | | |
|---|---|---|
| CN | 105208631 A | 12/2015 |
| CN | 105611488 A | 5/2016 |

(Continued)

OTHER PUBLICATIONS

Qiangwei Hang et al: "Design and implementation of mobile access system based on multi-factor authentication", 2012 International Conference on Computer Science and Information Processing (CSIP), IEEE, Aug. 24, 2012.

(Continued)

*Primary Examiner* — Robert M Morlan
(74) *Attorney, Agent, or Firm* — Syncoda LLC; Feng Ma

(57) ABSTRACT

A method for enabling a smart device to access a network can be applied to a control terminal, and include: receiving a first identification broadcast by the smart device, wherein the first identification is used to describe uniqueness of the smart device; in response to the first identification being matched with a smart device identification which is stored, determining that the smart device is a target device; and establishing a communication connection with the smart device, and sending network configuration information to the smart device, such that the smart device accesses the network according to the network configuration information.

17 Claims, 11 Drawing Sheets

(56) References Cited

U.S. PATENT DOCUMENTS

| | | | | |
|---|---|---|---|---|
| 2007/0157024 | A1* | 7/2007 | Miller | G06F 21/305 |
| | | | | 713/168 |
| 2018/0048632 | A1 | 2/2018 | Cammarota et al. | |
| 2019/0394643 | A1* | 12/2019 | Townend | H04W 12/06 |
| 2020/0314743 | A1* | 10/2020 | Baki | H04W 48/16 |

FOREIGN PATENT DOCUMENTS

| | | |
|---|---|---|
| CN | 107466085 A | 12/2017 |
| CN | 108769009 A | 11/2018 |
| CN | 108811179 A | 11/2018 |
| CN | 109314654 A | 2/2019 |
| CN | 109391699 A | 2/2019 |

OTHER PUBLICATIONS

Francisco Corella et al.: "Strong and Convenient Multi-Factor Authentication on Mobile Devices", Sep. 6, 2012, XP55043247.
"Multi-factor authentication mechanisms using a mobile device", ITU-T Draft; Study Period 2013-2016, International Telecommunication Union, Geneva, Ch, Nov. 13, 2015.
Extended European Search Report for EP Application No. 20185734.9 dated Dec. 15, 2020.
CN first office action in Application No. 201911078277.5, dated May 26, 2021.

\* cited by examiner

METHOD FOR ENABLING SMART DEVICE TO ACCESS NETWORK, NETWORK ACCESS METHOD, APPARATUS AND SHOPPING SYSTEM

CROSS-REFERENCE TO RELATED APPLICATIONS

This application claims priority to Chinese Patent Application No. 201911078277.5, filed on Nov. 6, 2019, the disclosure of which is hereby incorporated by reference in its entirety.

BACKGROUND

Artificial Intelligence (AI) plus Internet of Things (IoT), or AIoT, refers to intelligent interconnection of everything. For example, the internet of things can be enabled by artificial intelligence, big data, and cloud computing. An important application scenario of AIoT is smart homes.

SUMMARY

The present disclosure relates to generally the field of Internet of Things technologies, and more specifically to a method for enabling a smart device to access a network, a network access method, an apparatus, a device, a system, and a medium.

According to a first aspect of the present disclosure, there is provided a method for enabling a smart device to access a network, the method including:

receiving a first identification broadcast by the smart device, wherein the first identification is used to describe uniqueness of the smart device;

in response to the first identification is matched with a smart device identification which is stored, determining that the smart device is a target device; and establishing a communication connection with the smart device, and sending network configuration information to the smart device, so that the smart device accesses the network according to the network configuration information.

According to a second aspect of the present disclosure, there is provided a method for enabling a smart device to access a network, which is applied to a server of an online shopping system, the method including:

based on a purchase order for the smart device submitted by a specified user, determining a smart device identification of the smart device shipped corresponding to the purchase order; and feeding the smart device identification back to a control terminal, wherein the smart device identification is used to describe uniqueness of the smart device.

According to a third aspect of the present disclosure, there is provided a network access method, which is applied to a smart device, the network access method including:

broadcasting a first identification, so that after receiving the first identification, a control terminal determines that the smart device is a target device in response to the first identification is matched with stored smart device identification, wherein the first identification is used to describe uniqueness of the smart device;

establishing a communication connection with the control terminal, and receiving network configuration information sent by the control terminal; and accessing a network according to the network configuration information.

According to a fourth aspect of the present disclosure, there is provided an online shopping system, the online shopping system including a client-side and a server-side, the client-side is configured for a designated user to submit a purchase order for a smart device to the server-side;

the server-side is configured to determine a smart device identification of the smart device shipped corresponding to the purchase order based on the purchase order for the smart device submitted by the designated user;

the server-side is further configured to feed the smart device identification back to a control terminal, wherein the smart device identification is used to describe uniqueness of the smart device.

According to a fifth aspect of the present disclosure, there is provided an apparatus for enabling a smart device to access a network, the apparatus including:

a receiving module, configured to receive a first identification broadcast by the smart device, wherein the first identification is used to describe uniqueness of the smart device;

a determining module, configured to determine that the smart device is a target device in response to the first identification is matched with a smart device identification which is stored;

a connection establishing module, configured to establish a communication connection with the smart device; and a sending module, configured to send network configuration information to the smart device, so that the smart device accesses the network according to the network configuration information.

According to a sixth aspect of the present disclosure, there is provided an apparatus for enabling a smart device to access a network, the apparatus including:

a determining module, configured to, based on a purchase order for the smart device submitted by a specified user, determining a smart device identification of the smart device shipped corresponding to the purchase order; and a feedback module, configured to feed the smart device identification back to a control terminal, wherein the smart device identification is used to describe uniqueness of the smart device.

According to a seventh aspect of the present disclosure, there is provided a network access apparatus, which includes:

a broadcasting module, configured to broadcast a first identification, so that after receiving the first identification, a control terminal determines that the smart device is a target device in response to the first identification is matched with stored smart device identification, wherein the first identification is used to describe uniqueness of the smart device;

a connection establishing module, configured to establish a communication connection with the control terminal;

a receiving module, configured to receive network configuration information sent by the control terminal; and a network access module, configured to access a network according to the network configuration information.

According to an eighth aspect of the present disclosure, there is provided an electronic device comprising a processor and a memory device for storing processor-executable instructions, wherein the processor is configured to perform the following steps:

receiving a first identification broadcast by the smart device, wherein the first identification is used to describe uniqueness of the smart device;

in response to the first identification is matched with a smart device identification which is stored, determining that the smart device is a target device; and establishing a communication connection with the smart device, and sending network configuration information to the smart device, so that the smart device accesses the network according to the network configuration information.

According to a ninth aspect of the present disclosure, there is provided a computer device comprising a processor and a memory for storing processor-executable instructions, wherein the processor is configured to perform following steps:

based on a purchase order for the smart device submitted by a specified user, determining a smart device identification of the smart device shipped corresponding to the purchase order; and feeding the smart device identification back to a control terminal, wherein the smart device identification is used to describe uniqueness of the smart device.

According to a tenth aspect of the present disclosure, there is provided a computer device comprising a processor and a memory for storing processor-executable instructions, wherein the processor is configured to perform the following steps:

broadcasting a first identification, so that after receiving the first identification, a control terminal determines that the smart device is a target device in response to the first identification is matched with stored smart device identification, wherein the first identification is used to describe uniqueness of the smart device;

establishing a communication connection with the control terminal, and receiving network configuration information sent by the control terminal; and accessing a network according to the network configuration information.

According to an eleventh aspect of the present disclosure, there is provided a computer-readable storage medium having a computer program stored thereon, and when the program is executed by a processor, the following steps are performed:

receiving a first identification broadcast by the smart device, wherein the first identification is used to describe uniqueness of the smart device;

in response to the first identification is matched with a smart device identification which is stored, determining that the smart device is a target device; and establishing a communication connection with the smart device, and sending network configuration information to the smart device, so that the smart device accesses the network according to the network configuration information, or based on a purchase order for the smart device submitted by a specified user, determining a smart device identification of the smart device shipped corresponding to the purchase order; and feeding the smart device identification back to a control terminal, wherein the smart device identification is used to describe uniqueness of the smart device, or broadcasting a first identification, so that after receiving the first identification, a control terminal determines that the smart device is a target device in response to the first identification is matched with stored smart device identification, wherein the first identification is used to describe uniqueness of the smart device;

establishing a communication connection with the control terminal, and receiving network configuration information sent by the control terminal; and accessing a network according to the network configuration information.

It should be understood that the above general description and the following detailed description are only exemplary and explanatory, and do not limit the present disclosure.

BRIEF DESCRIPTION OF THE DRAWINGS

In order to more clearly explain the technical solutions in the embodiments of the present disclosure, the drawings required for the description of the embodiments will be briefly introduced below. It is obvious that the drawings in the following description are only some embodiments of the present disclosure. For those of ordinary skill in the art, other drawings can also be obtained based on these drawings, without paying any creative labor.

DETAILED DESCRIPTION

Figure 1A:
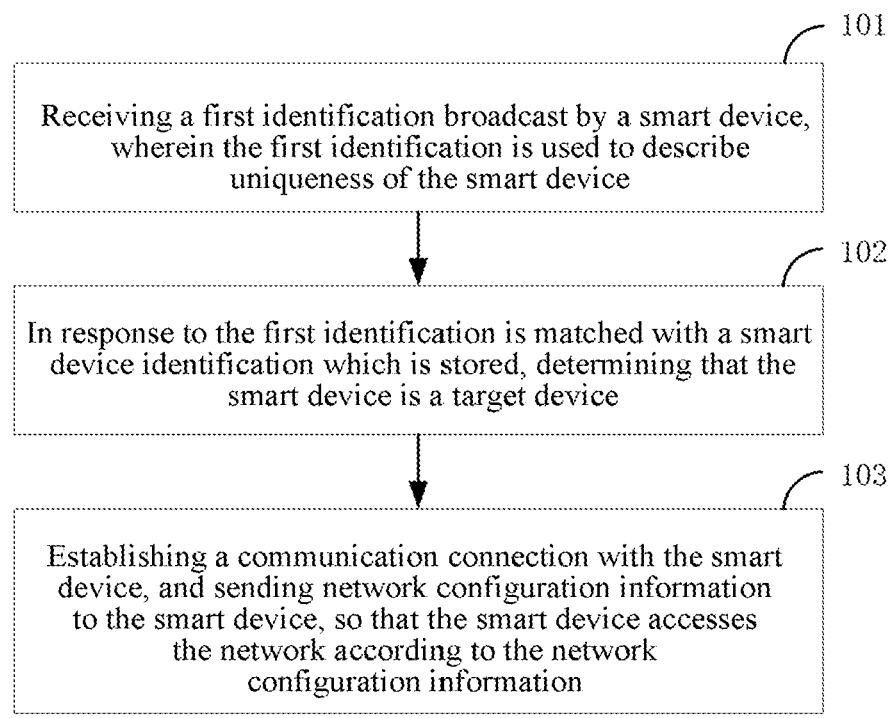
FIG. 1A is a flowchart of a method for enabling a smart device to access a network according to some embodiments.

Various embodiments of the present disclosure will be described clearly and completely in conjunction with the drawings in the embodiments of the present disclosure below. Obviously, the described embodiments are only a part of the embodiments of the present disclosure, but not all the embodiments. Based on the embodiments in the present disclosure, all other embodiments obtained by a person of ordinary skill in the art without creative efforts fall within the protection scope of the present disclosure.

Embodiments will be described in detail herein, examples of which are shown in the drawings. When the following description refers to the accompanying drawings, unless otherwise indicated, the same numerals in different drawings represent the same or similar elements. The embodiments described in the following embodiments do not represent all embodiments consistent with the present disclosure. Rather, they are merely examples of apparatuses and methods consistent with some aspects of the present disclosure as detailed in the appended claims.

The terminology used in this disclosure is for the purpose of describing particular embodiments only, and is not intended to limit this disclosure. The singular forms "a," "an" and "the" used in this disclosure and the appended claims are also intended to include plural form unless the context clearly indicates other meanings. It should also be understood that the term 'and/or' as used herein refers to and includes any or all possible combinations of one or more associated listed items.

It should be understood that although the terms "first," "second," "third," etc. may be used to describe various information in this disclosure, the information should not be limited to these terms. These terms are only used to distinguish same type of information from each other. For example, without departing from the scope of the present disclosure, the first information may also be referred to as second information, and similarly, the second information may also be referred to as first information. Depending on the context, the word "if" as used herein may be interpreted as "while" or "when" or "in response to a determination that . . . "

In smart home systems, two approaches may be adopted for solving initial network assignment of a smart device.

One way is Soft AP, that is, a smart device or a control terminal is simulated as a soft access node, so that the smart device and the control terminal are possible to connect point to point, and then exchange necessary information required to access a network, such as Service Set Identification (SSID) and authentication password for Wireless Local Area Network (WLAN), etc. However, the Soft AP needs to switch back to WLAN mode after establishing the soft access node, which takes a long time, and requires user to establish a connection with the soft access node by manual operations.

The other way is a combination of Bluetooth and WLAN. When a smart device is turned on, it uses Bluetooth beacon to broadcast, so that the control terminal can discover the smart device, and then the smart device and control terminal quickly establish a connection via Bluetooth. After that, user manually enters configuration information of the WLAN assigned by the control terminal. Then the configuration information is transmitted to the smart device, so that the smart device is assigned to WLAN. This method is faster than Soft AP, but still requires the user to search for device and configures it manually.

The following describes a method for enabling a smart device to access a network, a network access method, an apparatus, a device, a system, and a medium according to some embodiments of the present disclosure in detail with reference to the drawings. In the case of no conflict, the features in the following examples and implementations can be combined with each other.

A smart device needs to acquire network configuration information needed to access a network when it is first powered on, such as a Service Set Identification (SSID) and an authentication password of the wireless network WLAN or Wi-Fi, before the smart device can access the network. In the existing related technologies, it is generally required that a user operates a control terminal to establish a communication connection with the smart device, and manually enters the network configuration information of the network, then confirms sending it to the smart device. The smart device accesses the network according to the received network configuration information. However, the entire process requires manual operation by the user, which is time-consuming.

In order to solve the problem in the related art that the user needs manual operations to make the smart device to access the network, the present disclosure provides a method for enabling a smart device to access a network, which can be applied in various application scenarios of the Internet of Things, such as intelligent home, intelligent transportation, intelligent security and intelligent medical treatment, which are not specifically limited in this disclosure. The smart device may be a device with intellectualized functions in various application scenarios of the Internet of Things, for example, intelligent home appliance devices, intelligent medical devices, intelligent cars, intelligent home devices, intelligent door locks, etc., and the present disclosure does not make specific limitations about this. The method for enabling a smart device to access a network can also be applied in various application scenarios of accessing other networks, and the present disclosure does not make specific limitations about this.

Figure 1B:
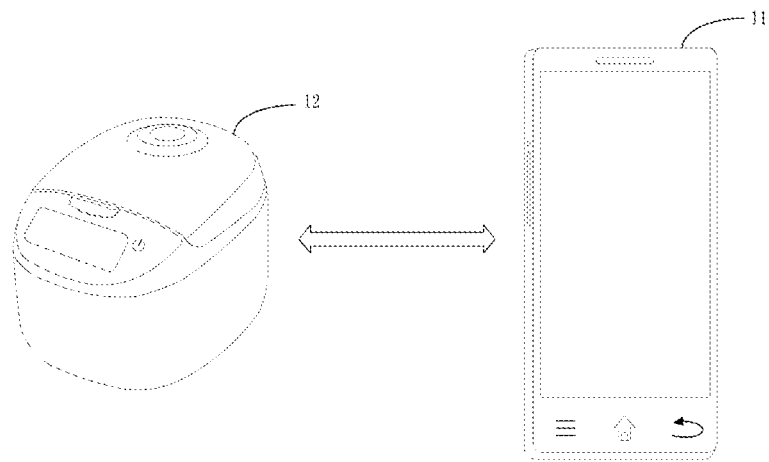
FIG. 1B is a scene diagram of a method for enabling a smart device to access a network according to some embodiments.

FIG. 1A is a flowchart of a method for enabling a smart device to access a network according to some embodiments, and FIG. 1B is a scene diagram of a method for enabling a smart device to access a network according to some embodiments. The method is applied to a control terminal. The control terminal may be any terminal or device with an internet access function, such as a mobile phone, a tablet computer, a PDA (Personal Digital Assistant), a smart watch, or a router. As shown in FIG. 1A, the method for enabling a smart device to access a network includes the following steps 101 to 103.

At step 101, a first identification broadcast by a smart device is received, wherein the first identification is used to describe uniqueness of the smart device.

In this step, the first identification refers to a smart device identification of the smart device which is broadcast to a control terminal. The first identification is an identification used to describe uniqueness of the smart device, and the smart device identification is an identification used to describe uniqueness of this kind of smart device, that is, each smart device has unique smart device identification. In some embodiments of the present disclosure, when the smart device is produced, the smart device identification is written into the smart device. For example, the smart device identification may be a product serial number. When the smart device is powered on for the first time, that is, the smart device starts running at the first time, the smart device has not accessed in any network at this time, so the smart device may broadcast its own smart device identification to a certain range based on a broadcast protocol, in order to be received by a device within the range. In this embodiment, the first identification broadcast by the smart device is received by the control terminal described above. In some embodiments of the present disclosure, the smart device may broadcast based on Bluetooth protocol, for example, Bluetooth beacon protocol. The smart device may also broadcast based on ZigBee protocol or Wi-Fi protocol. The present disclosure does not make specific limitations about this. It should be understood that the smart device can broadcast without establishing a connection with the control terminal.

At step 102, it is determined that the smart device is a target device, in response to that the first identification is matched with a smart device identification stored by the control terminal.

In this step, the control terminal stores at least one smart device identifications. After receiving the first identification broadcast by the smart device, the control terminal can call the stored smart device identifications to match with the first identification. Whether the smart device can be treated as the target device is determined by whether the matching is successful. That is, if the matching is successful, i.e., the first identification of the smart device is coincide with a smart device identification stored in the control terminal, it is determined that the smart device is the target device; if the matching fails, i.e., the first identification of the smart device is not coincide with a smart device identification stored in the control terminal, it is determined that the smart device is not the target device. When the smart device is the target device, that is to say, the smart device is capable to access current network. In this way, the security of accessing a network can be effectively improved.

At step 103, a communication connection with the smart device is established, and network configuration information is sent to the smart device, such that the smart device accesses the network according to the network configuration information.

In this step, after determining that the smart device is the target device, the control terminal automatically establishes the communication connection with the smart device and sends the network configuration information, such as SSID and authentication password, to the smart device. The smart device receives the network configuration information sent by the control terminal, and accesses the network according to the network configuration information.

In some embodiments of the present disclosure, the communication connection that the control terminal automatically establishes with the smart device may be a short-range communication connection. The short-range communication may be any one of communication protocol such as Bluetooth, ZigBee, Wi-Fi, Soft AP, NFC, infrared, etc., and includes but is not limited to the above communication protocol. The disclosure does not make specific limitations about this.

As an illustrative example, before sending the network configuration information to the smart device, the control terminal may acquire the network configuration information of the currently accessed wireless network; or may acquire the network configuration information of at least one wireless network stored in advance. For example, the network configuration information is pre-stored in the control terminal locally or stored in a cloud service device.

In some embodiments of the present disclosure, the network configuration information sent by the control terminal may be network configuration information of a wireless network that one smart device needs to access, and the smart device can access the network by receiving the network configuration information of the network that needs to access. For example, if the wireless network currently accessed by the control terminal is the network that the smart device needs to access, the control terminal sends the network configuration information of the currently accessed wireless network to the smart device, so that the smart device completes the access. For another example, if the control terminal does not currently access the network that the smart device needs to access, but the control terminal stores the network configuration information of the network, then the control terminal sends the network configuration information of the network to the smart device.

In some other embodiments of the present disclosure, the control terminal stores network configuration information of a plurality of wireless networks, for example, network configuration information of a network that a smart device needs to access. If the control terminal, by using a set identification, can identify the network configuration information of the network that the smart device needs to access, the control terminal sends the identified network configuration information of the network to the smart device. For another example, if the control terminal cannot identify which one of the stored network configuration information of the plurality of wireless networks is the network configuration information of the network that the smart device needs to access, the control terminal sends the network configuration information of the plurality of wireless networks to the smart device. After receiving the network configuration information of the plurality of wireless networks, the smart device attempts to access one by one, and the one that can be successfully accessed is the network that the smart device needs to access. In some embodiments of the present disclosure, the control terminal may send network configuration information of the plurality of wireless networks at the same time, or may send network configuration information of the plurality of wireless networks in turn.

It should be understood that the control terminal and the smart device in this embodiment may already be in an environment covered by the network that the smart device needs to access.

As an exemplary scenario, as shown in FIG. 1B, a control terminal 11 receives a first identification broadcast by a smart device 12 (taking a smart rice cooker as an example). When the first identification matches with a smart device identification stored by the control terminal 11, it is determined the smart device 12 is a target device. The control terminal 11 establishes a short-range communication connection with the smart device 12, and sends network configuration information to the smart device 12. The smart device 12 accesses the Internet of Things according to the network configuration information, and only the interaction between the control terminal 11 and the smart device 12 is involved in the entire process, without manual operations by the user.

According to the above method provided by some embodiments of the present disclosure, when the smart device is powered on at the first time, it can broadcast the first identification describing its uniqueness based on a broadcast protocol. After receiving the first identification of the smart device, the control terminal can make a match of the first identification and the stored smart device identifications to determine whether the smart device is a target device. When it is determined that the smart device is the target device by matching, the control terminal establishes a communication connection with the smart device and sends network configuration information to the smart device, so that the smart device automatically accesses the network according to the network configuration information after receiving the network configuration information. In this way, when the smart device is powered on, the control terminal automatically sends the network configuration information to the smart device after determining that the smart device is the target device. The smart device accesses the network according to the received network configuration information, and the entire process does not require manual operations by the user, which is faster and more convenient.

Figure 2:
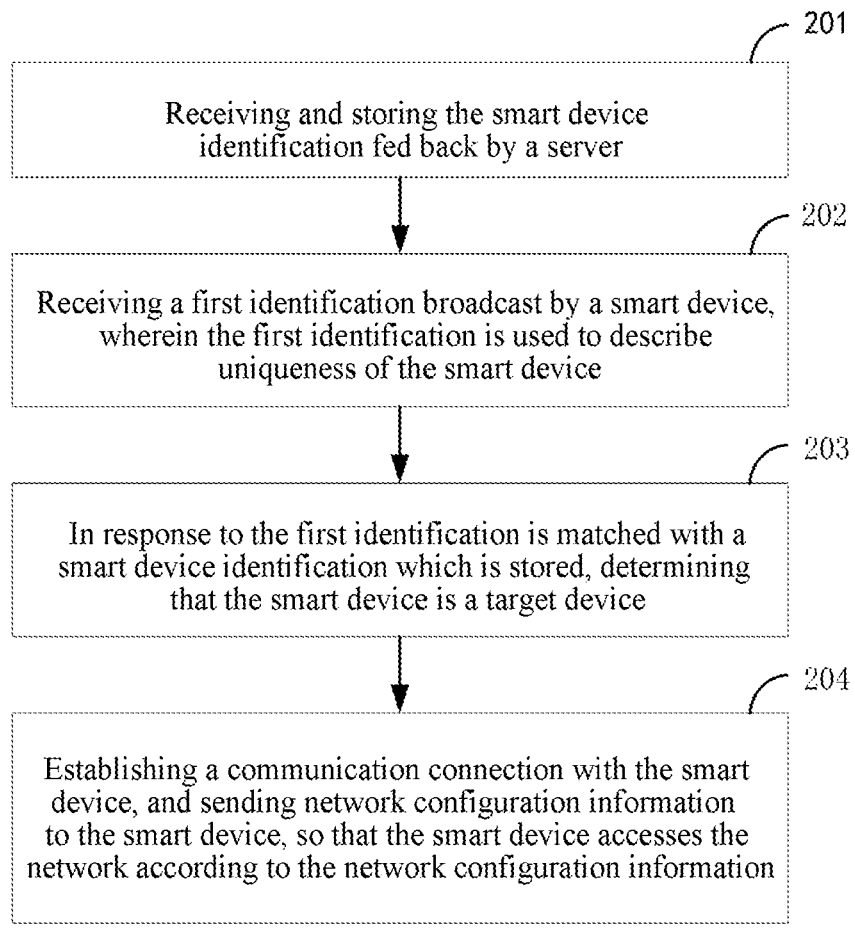
FIG. 2 is a flowchart of a method for enabling a smart device to access a network according to some embodiments.

FIG. 2 is a flowchart of another method for enabling a smart device to access a network according to some embodiments. Based on the foregoing embodiment, this embodiment makes illustration by using an example of how does the control terminal obtains the smart device identification. As shown in FIG. 2, the method includes steps 201 to 204.

At step 201, the smart device identification fed back by a server is received and stored.

In this step, the server stores the smart device identification of at least one smart device, and is capable to send the smart device identification to the control terminal. Before receiving the first identification broadcast by the smart device, the control terminal may receive the smart device identification fed back by the server, and store it locally. In this way, after receiving the first identification broadcast by the smart device, the control terminal is capable to call the stored smart device identification to make a match with the first identification, thus determining whether the smart device is the target device.

In some embodiments of the present disclosure, the server is a server of an online shopping system. The smart device identification is fed back from the server after a designated user submits a purchase order for the smart device. That is to say, by the designated user's behavior of purchasing a smart device online, after submitting a purchase order, the server of online shopping system will send the smart device identification of the smart device to the control terminal. In this way, before the smart device is delivered, the control terminal can acquire the smart device identification of the smart device and store it. After the smart device is delivered, the control terminal can make a match of the stored smart device identification and the received first identification broadcast by the delivered smart device, to confirm whether the delivered smart device is a smart device that the server notifies to be shipped, i.e., the target device. If the delivered smart device is the target device, the control terminal sends network configuration information to the smart device to enable the smart device to access the network. In this way, not only improve the security of accessing the network, thus avoid accessing of a smart device with unknown origin, but also avoid leakage of network configuration information stored in the control terminal.

At step 202, a first identification broadcast by the smart device is received, and the first identification is used to describe uniqueness of the smart device.

At step 203, it is determined that the smart device is a target device, in response to that the first identification is matched with stored smart device identification.

At step 204, a communication connection with the smart device is established, and network configuration information is sent to the smart device, such that the smart device can access network according to the network configuration information.

Steps 202 to 204 have same related technologies as that in the above steps 101 to 103, which will not be repeated herein.

In the above method provided in the embodiment shown in FIG. 2, before the smart device first powers on and broadcasts its first identification, the control terminal receives and stores the smart device identification sent by the server. In a certain exemplary scenario, the smart device identification is sent by the server of an online shopping system feeds back based on the purchase order of the specified user. In this way, the control terminal confirms whether the delivered smart device is a smart device shipped corresponding to the shopping order by using the smart device identification fed back by the server. When it is determined that the delivered smart device is the target device by matching, the control terminal establishes a communication connection with the smart device and sends network configuration information to the smart device, so that the smart device automatically accesses the network according to the network configuration information after receiving the network configuration information. In this way, on the one hand, when the smart device is powered on, the control terminal automatically sends network configuration information to the smart device after determining that the smart device is the target device, and the smart device accesses in the network according to the received network configuration information. The entire process does not require a user manual operation, which is fast and convenient. On the other hand, it may be confirmed whether the smart device is the target device before the smart device accesses the network. If the smart device is the target device, the smart device can access the network, thereby improving network security and avoiding accessing of an unknown smart device. This can also avoid leakage of the network configuration information stored by the control terminal.

The following description uses an example of a smart device identification fed back by a server of an online shopping system is received by the control terminal as an example.

In some embodiments, a user can choose to purchase a smart device through an online shopping platform. The online shopping platform is equipped with an online shopping system, which includes a server-side and a client-side. The server-side provides services through at least one server and can communicate with a plurality of client-sides. The user can become a client-side by registering a user account on the online shopping platform, and can buy various kinds of commodities on the online shopping platform. The specific sales scope of the online shopping system is not limited herein.

In some embodiments of the present disclosure, a designated user can search for purchasable information related to a smart device by entering a keyword on the client-side. When a smart device to be purchased is selected, a purchase of the smart device can be confirmed by submitting a purchase order. The server of the online shopping system can receive the purchase order submitted by the client-side and read order information in the purchase order. For example, the server can read an order number, type and model of the purchased commodity, a delivery address, and a contact method of the consignee, etc. The server can acquire the smart device identification of the smart device shipped corresponding to the purchase order, and can feed the smart device identification back to the control terminal.

In some embodiments of the present disclosure, the control terminal receives the smart device identification sent through a second identification by the server. The second identification is used to describe uniqueness of a home subscriber of the control terminal. For example, the second identification may be a user account of the home subscriber of the control terminal on the online shopping system or a social account of the home subscriber, such as a phone number, an email address, a social software account, etc. The second identification can also be a user account of the operation service system carried on the control terminal. That is to say, the server directly sends the smart device identification to the control terminal through the second identification. For example, the second identification is a phone number, en email address, a social software account, etc. of the home subscriber of the control terminal. In another possible implementation of the present disclosure, the control terminal downloads the smart device identification from the cloud service device. The smart device identification is uploaded by the server to the cloud service device through the second identification. That is to say, the server uploads the smart device identification to the cloud service device where the second identification is located, and the control terminal can download the smart device identification from the cloud service device through the second identification. In this way, the smart device identification can be uploaded to the cloud service device to control cloud storage space of home subscriber of the control terminal, which can avoid the loss and leakage of information and improve security. For example, in addition to describing uniqueness of the home subscriber of the control terminal, the second identification also carries a domain name of the cloud service device. Therefore, the server is capable to access the cloud service device. For another example, the second identification is a user account of the operation service system carried on the control terminal. The online shopping system is associated with the operation service system, so the server is possible to access the cloud service device of the operation service system. As another example, the online shopping system and the operation service system belong to same system, or the online shopping system is the own online shopping service of the operation service system. The server cluster of the operation service system includes the server and the cloud service device of the online shopping system, and the server of the online shopping system is capable to access the cloud service device.

In some embodiments of the present disclosure, the second identification is sent to the server by way of the designated user submitting the purchase order for the smart device, so that after acquiring the second identification, the server may feed the smart device identification back to the control terminal. That is to say, when the designated user submits the purchase order for the smart device, the second identification can be filled in order information. When receiving the second identification, the server may feed the smart device identification of the smart device shipped corresponding to the purchase order back to the control terminal through the second identification. The fed backed smart device identification received by the control terminal may be stored locally, so that when the smart device is delivered and the control terminal received the first identification broadcast by the smart device, it can be quickly matched.

It should be understood that the designated user and the home subscriber of the control terminal may be same user or different users. For example, the designated user may be a user who purchased the smart device. If the designated user purchases the smart device for his own use, the home subscriber of the control terminal is the designated user who purchased the smart device. After acquiring the smart device identification shipped corresponding to the smart device, the server can feed it back to the specified user through the second identification, and the control terminal of the specified user can receive the smart device identification. As another example, the designated user purchases the smart device for use by others, such as parents, friends, etc. That is to say, the home subscriber of the control terminal is not the designated user who purchased the smart device, and the second identification provided to the server by the designated user is the second identification of others. Then the server feeds the smart device identification back to the home subscriber of the control terminal through the second identification, and the control terminal can receive the smart device identification.

In order to improve the accuracy of the smart device identification received by the control terminal, in some embodiments of the present disclosure, the smart device identification is included in a first binding relationship of the smart device identification generated by the server and the second identification. That is to say, after receiving the second identification sent by the specified user and determining the smart device identification of the smart device shipped corresponding to the purchase order of the specified user, the server generates the first binding relationship by using the second identification and the smart device identification, that is, the home subscriber of the control terminal and the correspondingly shipped smart device generate a binding relationship, and the server feeds the first binding relationship back to the control terminal. According to the received first binding relationship, the control terminal can determine whether an object to which the information is sent by the server controls the home subscriber of the control terminal by the first binding relationship. If the object controls the home subscriber of the control terminal, stores the first binding relationship and acquires the smart device identification from the first binding relationship. If the object does not control the home subscriber of the terminal, the first binding relationship is not stored, and it can be fed back to the server to send an error message.

In another possible implementation of the present disclosure, in addition to generating the binding relationship according to the home subscriber of the control terminal and the smart device, the method further includes receiving a third identification sent through the second identification by the server to determine that an object to which the smart device identification is sent by the server is the control terminal itself. The third identification is sent to the server when the designated user submits the purchase order for the smart device, and the third identification is used to describe uniqueness of the control terminal. For example, the third identification is a product serial number of the control terminal. That is to say, when the designated user submits the purchase order for the smart device, the third identification is also sent to the server. When the server feeds the smart device identification back to the control terminal, the third identification can also be sent, so that when the control terminal receives the smart device identification and the third identification, whether the object to which the information is sent by the server is the control terminal itself can be determined by the third identification to ensure the accuracy of the information.

In some embodiments of the present disclosure, after receiving the third identification sent by the designated user, the server may also generate a second binding relationship between the smart device identification and the third identification, and feed it back to the control terminal through the second identification. The third identification is used to describe uniqueness of the control terminal. That is to say, after receiving the third identification sent by the specified user and determining the smart device identification of the smart device shipped corresponding to the purchase order of the specified user, the server may use the third identification and the smart device identification to generate the second binding relationship. That is, in this embodiment, the control terminal itself and the corresponding shipped smart device generate a binding relationship, and the server feeds the second binding relationship back to the control terminal through the second identification. According to the received second binding relationship, the control terminal can determine whether an object to which the information is sent by the server controls the terminal by the second binding relationship. If the object controls the terminal, stores the second binding relationship and acquires the smart device identification from the second binding relationship. If the object does not control the terminal, the second binding relationship is not stored, and can be fed back to the server to send an error message.

In some embodiments of the present disclosure, the server may also generate a third binding relationship based on the smart device identification, the second identification, and the third identification, and feed the third binding relationship back to the control terminal through the second identification.

The various technical features in the above embodiments can be combined arbitrarily, as long as there is no conflict or contradiction in combinations between the features, but they are not described one by one due to the limited space.

Figure 3:
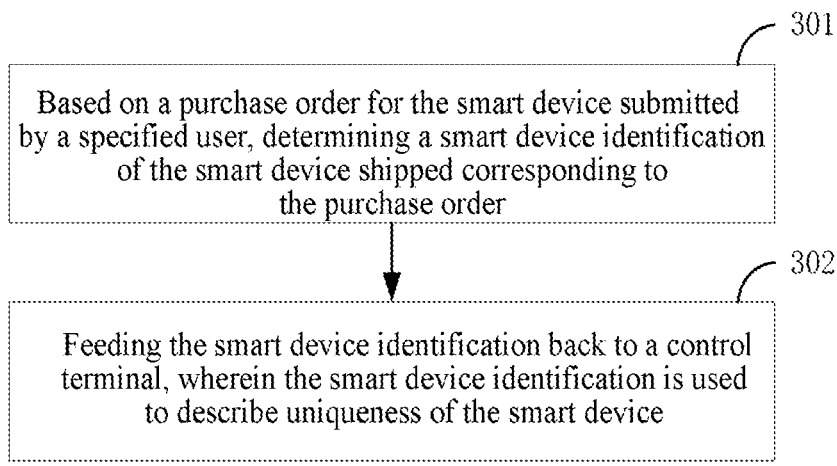
FIG. 3 is a flowchart of another method for enabling a smart device to access a network according to some embodiments.

FIG. 3 is a flowchart of another method for enabling a smart device to access a network according to some embodiments of the present disclosure. The method is applied to a server of an online shopping system. The online shopping system of this embodiment has same related technologies described as in the online shopping system above and will not be repeated herein. As shown in FIG. 3, the method for enabling the smart device to access the network includes the following steps 301 to 302.

At step 301, based on a purchase order for a smart device submitted by a specified user, smart device identification of the smart device shipped corresponding to the purchase order is determined.

In this step, after receiving the purchase order for the smart device submitted by the specified user and before shipping the smart device, the server may determine the smart device shipped corresponding to the specified user's purchase order and the smart device identification corresponding to said smart device.

In some embodiments of the present disclosure, a person for shipping on the online shopping platform may send an order number of the purchase order and the smart device identification of the corresponding smart device to the server. For example, the person for shipping manually enters the order number and the smart device identification to send them to the server. For another example, the person for shipping scans labels of the purchase order and the smart device identification and sends them to the server. The label may be a bar code label, a two-dimensional code label, a Radio Frequency Identification (RFID) label, or the like. After receiving the order number and the smart device identification, the server may use the order number and the smart device identification to generate a binding relationship, thus determining the smart device corresponding to the purchase order.

At step 302, the smart device identification is fed back to the control terminal, wherein the smart device identification is used to describe uniqueness of the smart device.

In this step, after determining the smart device corresponding to the purchase order, the server feeds the smart device identification corresponding to the smart device back to the control terminal, so that the control terminal can obtain the smart device identification of the upcoming smart device in advance, and after receiving the first identification broadcast by the smart device, the control terminal can call the stored smart device identification to make a match with the first identification, thus determining whether the delivered smart device is the target device.

In the above method provided by the embodiment shown in FIG. 3, before shipping, the server of the online shopping system determines the smart device shipped corresponding to the purchase order of the specified user and the smart device identification corresponding to said smart device, and feeds the smart device identification back to the control terminal. In this way, the control terminal confirms whether the delivered smart device is the smart device shipped corresponding to purchase order through the smart device identification fed back by the server. When it is determined that the smart device is the target device by matching, a communication connection is established between the control terminal and the smart device, and network configuration information is sent to the smart device, so that after receiving the network configuration information, the smart device automatically access the network according to the network configuration information. In this way, it can be determined whether the smart device is the target device before it accesses the network. If the smart device is the target device, the smart device can access the network, thereby improving network security, avoiding accessing of an unknown smart device, and also avoiding leakage of the network configuration information stored by the control terminal.

Figure 4:
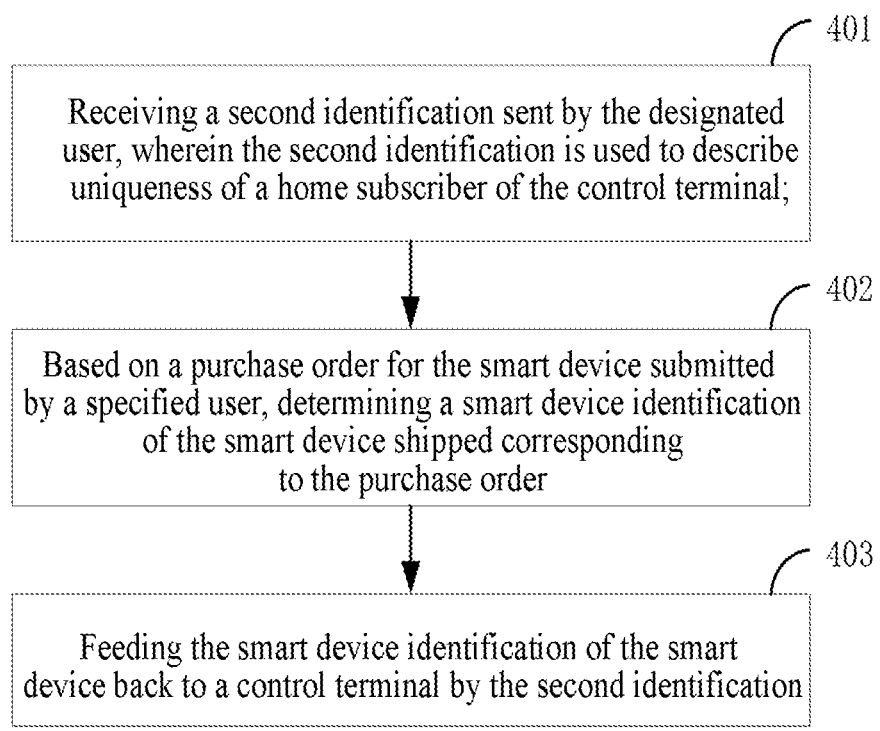
FIG. 4 is a flowchart of yet another method for enabling a smart device to access a network according to some embodiments.

FIG. 4 is a flowchart of another method for enabling a smart device to access a network according to some embodiments of the present disclosure. This embodiment is based on the embodiment shown in FIG. 3, and makes illustration by using an example of how does the server feed the smart device identification back to the control terminal. As shown in FIG. 4, the method includes steps 401 to 403.

At step 401, a second identification sent by the designated user is received, wherein the second identification is used to describe uniqueness of the home subscriber of the control terminal.

In this step, when the designated user submits the purchase order for the smart device, the second identification may be filled in order information, and the server may receive the second identification of the designated user by reading the order information of the purchase order.

At step 402, based on the purchase order for the smart device submitted by the specified user, a smart device identification of the smart device shipped corresponding to the purchase order is determined.

Step 402 has same related technology as that in step 301 described above, and will not be repeated herein again.

At step 403, the smart device identification of the smart device is fed back to the control terminal through the second identification.

In this step, the server may feed the smart device identification of the smart device shipped corresponding to the purchase order back to the control terminal through the second identification. The feed-backed smart device identification received by the control terminal may be stored locally, so that when the smart device is delivered and the first identification broadcast by the smart device is received, it can be quickly matched.

In some embodiments of the present disclosure, the smart device identification is sent to the control terminal through the second identification.

In another possible implementation of the present disclosure, the smart device identification is uploaded to the cloud service device through the second identification, so that the control terminal downloads the smart device identification from the cloud service device.

In some embodiments of the present disclosure, in order to improve the accuracy of the smart device identification fed back to the control terminal, after receiving the second identification sent by the designated user, based on the smart device identification and the second identification, the server generates a first binding relationship of the smart device identification and the second identification; and feeds the first binding relationship back to the control terminal through the second identification.

In addition to generating a binding relationship according to the home subscriber of the control terminal and the smart device, in another possible implementation of the present disclosure, the server also receives a third identification sent by the designated user. The third identification is used to describe uniqueness of the control terminal, and the smart device identification and the third identification are fed back to the control terminal through the second identification. In some embodiments of the present disclosure, the server may generate a second binding relationship of the smart device identification and the third identification based on the smart device identification and the third identification; and feed the second binding relationship back to the control terminal through the second identification. The server may also generate a third binding relationship based on the smart device identification, the second identification, and the third identification; and feed the third binding relationship back to the control terminal through the second identification.

The foregoing several possible implementations have same related technologies as in the embodiments shown in FIGS. 1A to 2, and will not described herein again.

In the above method provided by the embodiment shown in FIG. 4, the server of the online shopping system feeds the smart device identification back to the control terminal through a second identification which describes uniqueness of the home subscriber of the control terminal, to ensure that the control terminal is possible to receive the smart device identification. The control terminal is capable to acquire the smart device identification of the upcoming smart device in advance, and determine whether it matches after the smart device is delivered. After determining that the smart device is the target device, the network configuration information is sent to the smart device to enable the smart device automatically accesses the network according to the network configuration information after receiving the network configuration information. In this way, whether the smart device is the target device is confirmed before it accessing the network. If it is the target device, the smart device can access the network, thereby improving network security, avoiding accessing of an unknown smart device, and also avoiding leakage of the network configuration information stored by the control terminal.

Figure 5:
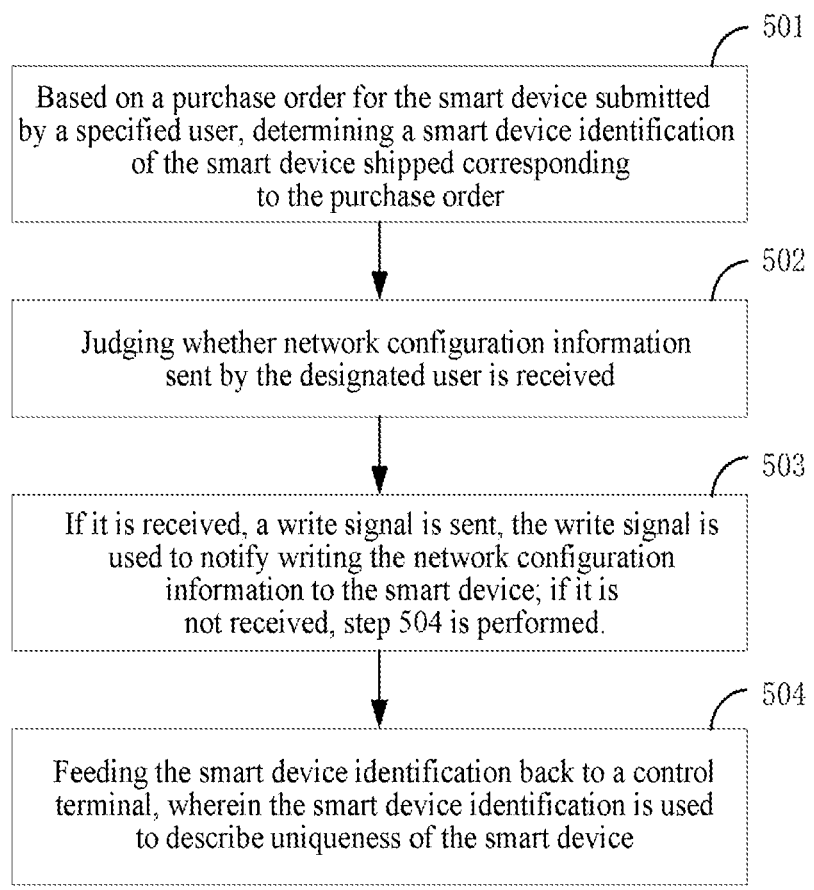
FIG. 5 is a flowchart of yet another method for enabling a smart device to access a network according to some embodiments.

FIG. 5 is a flowchart of another method for enabling a smart device to access a network according to some embodiments of the present disclosure. This embodiment is explained based on the embodiment shown in FIG. 3. As shown in FIG. 5, the method includes steps 501 to 504.

At step 501, based on a purchase order for a smart device submitted by a specified user, smart device identification of the smart device shipped corresponding to the purchase order is determined.

Step 501 has same related technology as in step 301 above described, and will not be repeated herein.

At step 502, whether network configuration information sent by the designated user is received is determined.

In this step, the server determines whether at least one network configuration information is sent by the specified user. For example, when a specified user submits a purchase order for a smart device, he should fill at least one of network configuration information into order information of the purchase order, and the server determines whether there has network configuration information by reading the order information.

In some embodiments of the present disclosure, the network configuration information is network configuration information of a network that the smart device is going to access. For example, in a detail page of the purchase order of the online shopping system, an option of 'whether to write the network configuration information of the network into the smart device' can be set for the client-side to choose. When the client-side receives 'YES' of a user instruction, an input box for network configuration information is provided to the user for inputting. After the user enters the network configuration information and submits a purchase order, the server can read it out from the purchase order.

At step 503, if the network configuration information sent by the designated user is received, a write signal is sent. The write signal is used to notify writing of the network configuration information to the smart device. If network configuration information sent by the designated user is not received, step 504 is performed.

In this step, if the specified user's purchase order includes the network configuration information, the server sends the write signal in response to receiving the network configuration information sent by the specified user. The write signal is used to notify writing of the network configuration information to the smart device. Sending the write signal indicates that the network configuration information of the network which is going to be accessed can be written to the smart device corresponding to the purchase order. In this way, when the smart device reaches the coverage of said network and is powered on for the first time, the smart device is possible to access the network according to the written network configuration information. For example, the server sends the write signal to the writing device, and after receiving the write signal, the writing device writes the network configuration information into the smart device shipped corresponding to the purchase order. In some embodiments of the present disclosure, the server also sends the smart device identification and network configuration information corresponding to the shopping order to the writing device. In this way, after receiving the write signal, the writing device determines a smart device to be written according to the received smart device identification, and writes the network configuration information to the smart device. If the specified user's purchase order received by the server does not include the network configuration information, there is no need to write the network configuration information to the smart device. The server feeds the smart device identification corresponding to the delivered smart device back to the control terminal in response to not receiving the network configuration information sent by the specified user.

In some embodiments of the present disclosure, in a case where the server receives the network configuration information sent by the designated user, the server may also send the smart device identification corresponding to the smart device to the control terminal. Although the smart device corresponding to the purchase order of the designated user has been written into the network configuration information of the network to be accessed (so when the smart device is power on for the first time, it can access the network according to the written network configuration information), but when the smart device is delivered, the control terminal further can determine whether the delivered smart device is the target device by the smart device identification received in advance, before the smart device is started, and if the delivered smart device is the target device, the smart device is started. Therefore, after the smart device is powered on, it can automatically access the network according to the written network configuration information.

For example, the smart device identification is printed or labeled on an outer surface of the smart device. For another example, a pattern or a label describing the smart device identification is printed or labeled on an outer surface of the smart device. For example, the smart device identification is printed or labeled on a packaging of the smart device. For another example, a pattern or a label describing the smart device identification is printed or labeled on a packaging of the smart device. For other example, an attachment printed or labeled with the smart device identification or a pattern describing the smart device identification is included in a packaging of the smart device, such as Instruction Book, Product Card, Label, Signage, etc. Before starting the smart device, the control terminal may determine whether the delivered smart device is the target device by comparing the received smart device identification sent by the server and the smart device identification on the outer surface or packaging of the smart device. Whether the delivered smart device is the target device can also be determined by the control terminal scanning the pattern or the label describing the smart device identification on the outer surface or the packaging of the smart device to obtain the smart device identification corresponding to the delivered smart device and then making a match with the locally stored smart device identification. In some embodiments of the present disclosure, the pattern or the label describing the identification of the smart device may be a bar code, a two-dimensional code, an RFID, or the like. At step 504, the smart device identification is feedback to the control terminal, and the smart device identification is used to describe uniqueness of the smart device.

Step 504 has same related technology as in step 302 above described, and will not be repeated herein.

In the above method provided by the embodiment shown in FIG. 5, the server determines whether the network configuration information sent by the designated user is received, and determines how smart device accesses the network, a manner about how smart device accesses the network is selected by the designated user. When the server does not receive the network configuration information, the smart device identification is fed back to the control terminal. The control terminal is capable to obtain the smart device identification of the upcoming smart device in advance, and determines whether it matches after the smart device is delivered, in order to determine whether the smart device is a target device. After determining that the smart device is the target device, the control terminal sends the network configuration information to the smart device, so that after receiving the network configuration information, the smart device automatically accesses the network according to the network configuration information. In this way, whether the smart device is the target device can be confirmed before the smart device accessing the network. If the network configuration information is received, the network configuration information is automatically sent to the smart device. The smart device accesses the network according to the received network configuration information. The entire process does not need the user performs manual operations, which is fast and convenient, and can improve network security and avoid accessing of a smart device with unknown origin. When the server receives the network configuration information sent by the designated user, it sends a write signal to write the network configuration information to the smart device. In this way, when the smart device reaches coverage of the network and is powered on for the first time, the smart device is capable to access the network according to the written network configuration information. The entire process does not require interaction with the control terminal or user input operation to obtain the network configuration information, which is faster and more convenient.

Figure 6:
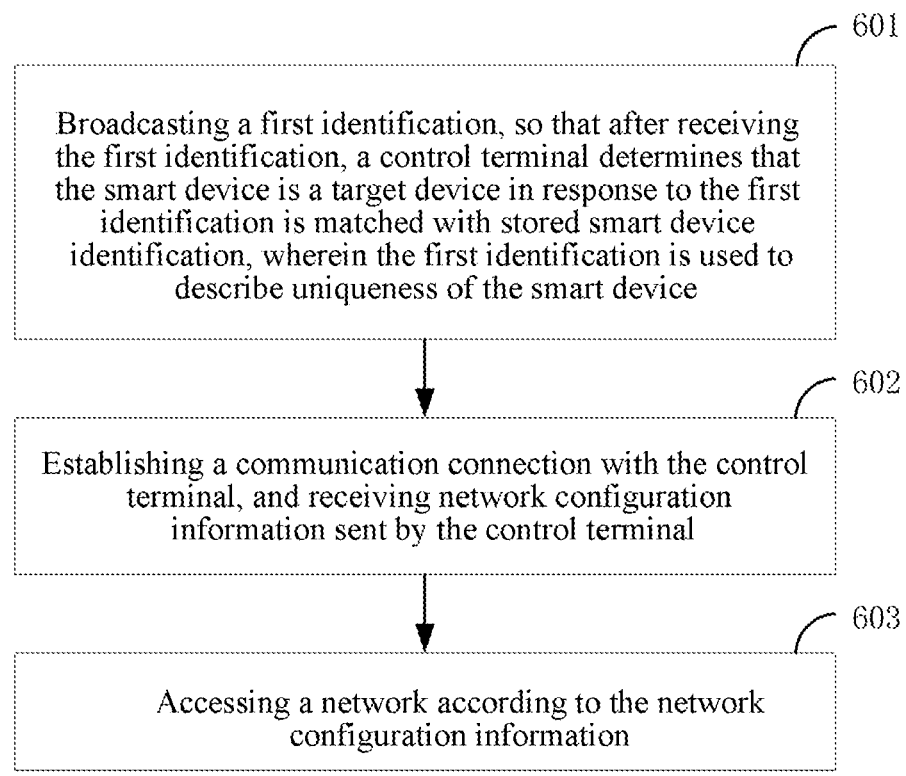
FIG. 6 is a flowchart of a network access method according to some embodiments.

FIG. 6 is a flowchart of a network access method according to some embodiments of the present disclosure. The method is applied to a smart device. This embodiment makes illustration based on the embodiment shown in FIG. 1A. As shown in FIG. 6, the network access method includes the following steps 601 to 603.

At step 601, a first identification is broadcast, so that after receiving the first identification, the control terminal determines that the smart device is a target device in response to the first identification is matched with stored smart device identification, wherein the first identification is used to describe uniqueness of the smart device.

In this step, when the smart device is powered on for the first time, the smart device broadcasts the first identification describing its uniqueness based on a broadcast protocol, so that after the control terminal receives the first identification of the smart device, make a match of the first identification and the stored smart device identification to determine whether the smart device is the target device.

At step 602, a communication connection with the control terminal is established, and network configuration information sent by the control terminal is received.

In this step, after the control terminal determines that the smart device is the target device, the control terminal automatically initiates the establishment of a communication connection with the smart device. At this time, the smart device accepts a connection request of the control terminal, establishes the communication connection with the control terminal, and receives the network configuration information sent by the control terminal.

At step 603, the smart device accesses a network according to the network configuration information.

In this step, the smart device accesses the corresponding network according to the received network configuration information.

In the above method provided by the embodiment shown in FIG. 6, when the smart device is powered on for the first time, it broadcasts a first identification describing its uniqueness based on a broadcast protocol, and after the control terminal receives the first identification of the smart device, it can match the first identification with the stored smart device identification to determine whether the smart device is a target device. When it is determined that the smart device is the target device through matching, the control terminal establishes a communication connection with the smart device and sends network configuration information to the smart device, so that the smart device automatically accesses the network according to the network configuration information after receiving the network configuration information. In this way, when the smart device is powered on, the control terminal automatically sends the network configuration information to the smart device after determining that the smart device is the target device. The smart device accesses the network according to the received network configuration information, and the entire process does not require any manual operation by the user, which is fast and convenient.

Figure 7:
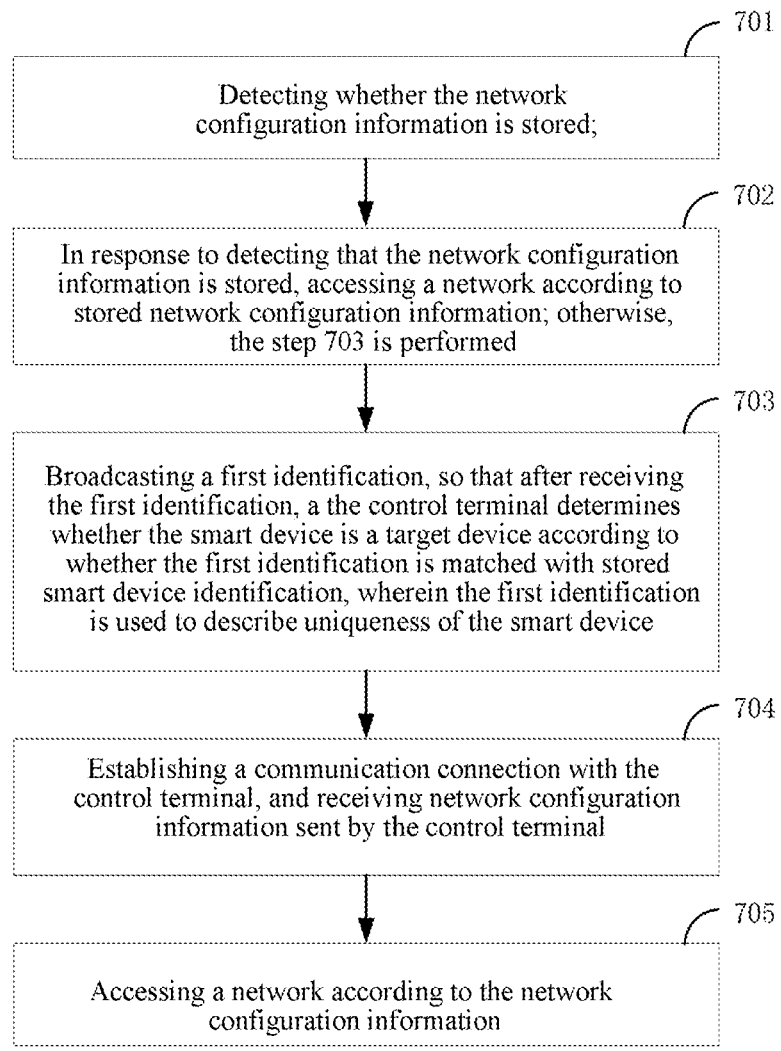
FIG. 7 is a flowchart of a network access method according to some embodiments.

FIG. 7 is a flowchart of a network access method according to some embodiments of the present disclosure. The method is applied to a smart device. This embodiment makes illustration based on the embodiment shown in FIG. 6. As shown in FIG. 7, the network access method includes the following steps 701 to 705.

At step 701, it is detected whether the network configuration information is stored.

In this step, when the smart device is powered on for the first time, it is detected whether the smart device itself has stored at least one of network configuration information.

In some embodiments of the present disclosure, before the smart device is shipped, the writing device may write the network configuration information of the network needs to be accessed according to the received information of the purchase order into the smart device. It may also be that when the smart device is produced, the writing device writes the network configuration information of the network needs to be accessed according to the received information of the purchase order into the smart device.

At step 702, in response to detecting that the network configuration information is stored, the network is accessed according to the stored network configuration information; otherwise, i.e., it is detected that the network configuration information is not stored, perform step 703.

In this step, if the smart device detects that the smart device itself stores network configuration information, it accesses the network according to the network configuration information to achieve fast access. If it is detected that no network configuration information is stored, the first identification describing its uniqueness is broadcast based on the broadcast protocol to acquire the network configuration information required to access the Internet of Things.

At step 703, a first identification is broadcast, so that after receiving the first identification, the control terminal determines whether the smart device is a target device according to whether the first identification is matched with stored smart device identification, wherein the first identification is used to describe uniqueness of the smart device.

At step 704, a communication connection with the control terminal is established, and network configuration information sent by the control terminal is received.

At step 705, the smart device accesses a network according to the network configuration information.

Steps 703 to 705 have the same related technologies as in the above steps 601 to 603, and are not repeated herein.

In the above method provided by the embodiment shown in FIG. 7, the smart device detects whether the smart device itself stores the network configuration information, and when it is detected that the network configuration information is not stored, the smart device broadcasts the first identification describing its uniqueness based on a broadcast protocol, so that after receiving the first identification of the smart device, the control terminal may make a match of the first identification and the stored smart device identification to determine whether the smart device is a target device. When it is determined that the smart device is the target device through matching, the control terminal establishes a communication connection with the smart device and sends network configuration information to the smart device, so that the smart device automatically accesses the network according to the network configuration information after receiving the network configuration information. In this way, when the smart device is powered on, the control terminal automatically sends the network configuration information to the smart device after determining that the smart device is the target device, and the smart device accesses the network according to the received network configuration information. The entire process does not require manual operation by the user, which is fast and convenient. When the smart device detects that it has stored network configuration information, it accesses the network according to the stored network configuration information. The entire process does not require interaction with the control terminal or user input operation to obtain network configuration information, which is faster and more convenient.

Figure 8:
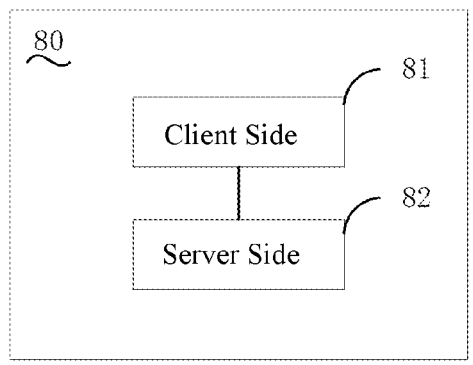
FIG. 8 is a structural block diagram of an online shopping system according to some embodiments.

FIG. 8 is a structural block diagram of an online shopping system 80 shown in some embodiments of the present disclosure. As shown in FIG. 8, the system includes a client-side 81 and a server-side 82.

The client-side 81 is used for making a designated user to submit a purchase order for a smart device to the server.

The server-side 82 is used for determining the smart device shipped corresponding to the purchase order based on the purchase order for the smart device submitted by the designated user.

The server-side 82 is also used for feeding smart device identification of the smart device back to the control terminal, wherein the smart device identification is used to describe uniqueness of the smart device.

The online shopping system in this embodiment has same related technology of the online shopping system as in any of the above embodiments, and will not be repeated herein.

Figure 9:
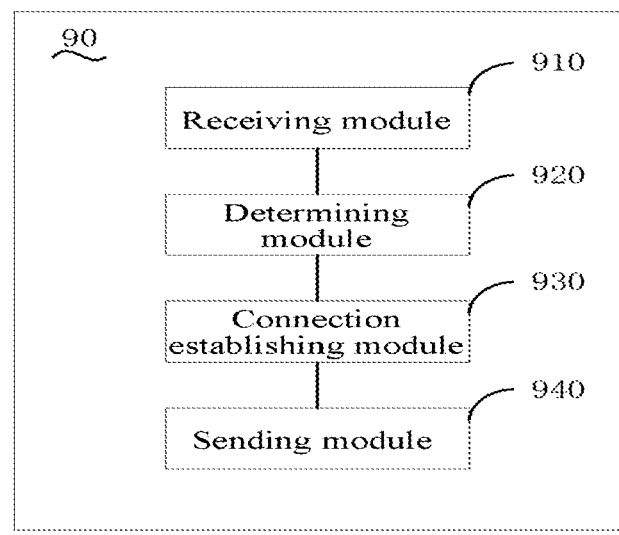
FIG. 9 is a structural block diagram of an apparatus for enabling a smart device to access a network according to some embodiments.

FIG. 9 is a structural block diagram of an apparatus for enabling a smart device to access a network shown in some embodiments of the present disclosure. The apparatus for enabling a smart device to access a network may be applied to a control terminal. As shown in FIG. 9, the apparatus 90 includes a receiving module 910, a determining module 920, a connection establishing module 930 and a sending module 940.

The receiving module 910 is used for receiving a first identification broadcast by a smart device, wherein the first identification is used to describe uniqueness of the smart device.

The determining module 920 is used for determining that the smart device is a target device in response to the first identification is matched with stored smart device identification.

The connection establishing module 930 is used for establishing a communication connection with the smart device.

The sending module 940 is used for sending network configuration information to the smart device, so that the smart device accesses a network according to the network configuration information.

In some embodiments, the receiving module is further used for receiving and storing the smart device identification fed back by the server before receiving the first identification broadcast by the smart device.

In some embodiments, the server is a server of an online shopping system, and the smart device identification is fed back by the server after a designated user submits a purchase order of the smart device.

In some embodiments, the smart device identification fed back by the server is received by one way of followings:

receiving the smart device identification sent through a second identification by the server; or downloading the smart device identification from a cloud service device, said smart device identification is uploaded to the cloud service device through the second identification by the server;

wherein the second identification is used to describe uniqueness of a home subscriber of the control terminal.

In some embodiments, the second identification is sent to the server by the designated user submitting the purchase order for the smart device, so that after acquiring the second identification, the server feeds the smart device identification back to the control terminal.

In some embodiments, the receiving module is further used for receiving a third identification sent through the second identification by the server to determine that an object to which the smart device identification is sent by the server is the control terminal itself.

The third identification is sent to the server when the designated user submits the purchase order for the smart device, and the third identification is used to describe uniqueness of the control terminal.

Figure 10:
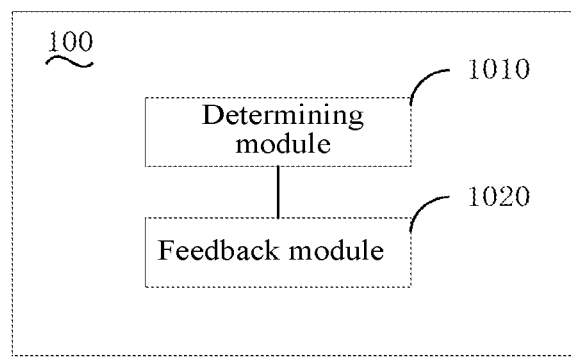
FIG. 10 is a structural block diagram of another apparatus for enabling a smart device to access a network according to some embodiments.

According to a sixth aspect of the embodiments of the present disclosure, an apparatus for enabling a smart device to access a network is provided. FIG. 10 is a structural block diagram of the apparatus for enabling a smart device to access a network shown in some embodiments of the present disclosure. The apparatus may be applied to a server of an online shopping system. As shown in FIG. 10, the apparatus 100 includes a determining module 1010 and a feedback module 1020.

The determining module 1010 is used to, based on a purchase order for the smart device submitted by a specified user, determine a smart device identification of the smart device shipped corresponding to the purchase order.

The feedback module 1020 is used to feed the smart device identification back to a control terminal, wherein the smart device identification is used to describe uniqueness of the smart device.

In some embodiments, the apparatus further includes a receiving module, which is used to receive a second identification sent by the designated user before determining the smart device shipped corresponding to the purchase order, wherein the second identification is used to describe uniqueness of a home subscriber of the control terminal;

The feedback module is used to feed the smart device identification back to the control terminal through the second identification.

In some embodiments, the receiving module is further used to receive a third identification sent by the designated user before determining the smart device shipped corresponding to the purchase order, wherein the third identification is used to describe uniqueness of the control terminal.

The feedback module is used to feed the smart device identification and the third identification back to the control terminal through the second identification.

In some embodiments, the apparatus further includes a sending module. The sending module is used to send a write signal in response to receiving network configuration information sent by the designated user, before feeding the smart device identification back to the control terminal. The write signal is used to notify writing of the network configuration information to the smart device.

The feedback module is used to perform the step of feeding back the smart device identification to the control terminal, in response to not receiving the network configuration information sent by the designated user.

Figure 11:
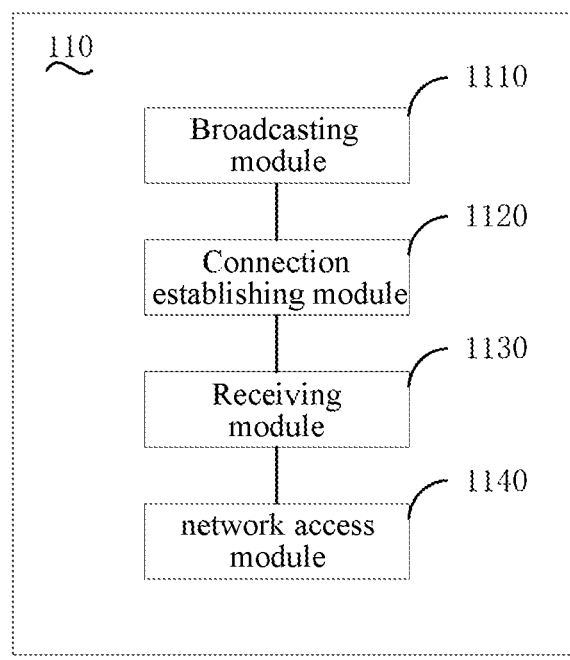
FIG. 11 is a structural block diagram of a network access apparatus according to some embodiments.

According to a seventh aspect of the embodiments of the present disclosure, a network access apparatus is provided. FIG. 11 is a structural block diagram of a network access apparatus shown in some embodiments of the present disclosure. The network access apparatus may be applied to smart devices. As shown in FIG. 11, the network access apparatus 110 includes a broadcasting module 1110, a connection establishing module 1120, a receiving module 1130, and a network access module 1140.

The broadcasting module 1110 is used for broadcasting a first identification, so that after receiving the first identification, a control terminal determines that the smart device is a target device in response to the first identification is matched with stored smart device identification, wherein the first identification is used to describe uniqueness of the smart device.

The connection establishing module 1120 is used for establishing a communication connection with the control terminal.

The receiving module 1130 is used for receiving network configuration information sent by the control terminal.

The network access module 1140 is used for accessing the network according to the network configuration information.

In some embodiments, the apparatus further includes a detecting module.

The detecting module is used for detecting whether network configuration information is stored before broadcasting the first identification.

The network access module is used for accessing the network according to the stored network configuration information in response to a detection result that the network configuration information is stored.

The broadcasting module is used for performing the step of broadcasting the first identification in response to a detection result that the network configuration information is not stored.

Regarding the apparatuses in the above embodiments, the specific manners in which the respective modules perform operations have been described in detail in the embodiments related to the method, and will not be elaborated herein.

Figure 12:
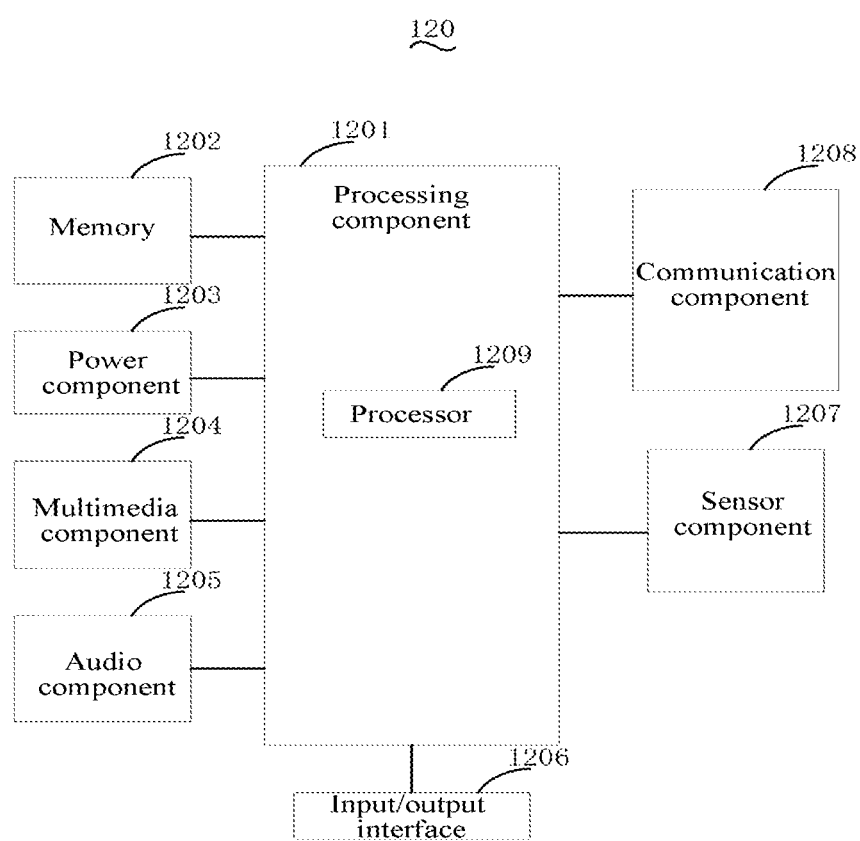
FIG. 12 is a schematic structural diagram of an electronic device according to some embodiments.

According to an eighth aspect of some embodiments of the present disclosure, an electronic device is provided. FIG. 12 is a schematic structural diagram of an electronic device shown in some embodiments of the present disclosure. As shown in FIG. 12, an apparatus 120 for enabling a smart device to access a network is shown according to some embodiments. For example, the apparatus 120 may be provided as an electronic device. The electronic device may be a computer, a mobile phone, a digital broadcasting terminal, a message transceiver, a game console, a tablet device, a medical equipment, a fitness equipment, a personal digital assistant and other terminals.

Referring to FIG. 12, the apparatus 120 may include one or more of the following components: a processing component 1201, a memory 1202, a power component 1203, a multimedia component 1204, an audio component 1205, an input/output (I/O) interface 1206, a sensor component 1207, and a communication components 1208.

The processing component 1201 generally controls the overall operations of the apparatus 120, such as operations associated with display, telephone calls, data communication, camera operations, and recording operations. The processing component 1201 may include one or more processors 1209 to execute instructions to complete all or part of the steps in the above method. In addition, the processing component 1201 may include one or more modules to facilitate interaction between the processing component 1201 and other components. For example, the processing component 1201 may include a multimedia module to facilitate interactions between the multimedia component 1204 and the processing component 1201.

The memory 1202 is configured to store various types of data to support operations at the apparatus 120. Examples of these data include instructions for any application or method operating on the apparatus 120, contact data, phone book data, messages, pictures, videos, and so on. The memory 1202 may be implemented by any type of volatile or nonvolatile storage device or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

The power supply component 1203 provides power to various components of the apparatus 120. The power supply component 1003 may include a power management system, one or more power supplies, and other components associated with generating, managing, and distributing power for the device 120.

The multimedia component 1204 includes a screen that provides an output interface between the apparatus 120 and the user. In some embodiments, the screen may include a liquid crystal display (LCD) and a touch panel (TP). If the screen includes a touch panel, the screen may be implemented as a touch screen to receive input signals from the user. The touch panel includes one or more touch-sensors to sense touching, sliding, and gestures on the touch panel. The touch sensor may not only sense the boundary of the touching action or sliding action, but also detect the duration and pressure related to the touching operation or sliding operation. In some embodiments, the multimedia component 1204 includes a front camera and/or a rear camera. When the apparatus 120 is in an operation mode, such as a shooting mode or a video mode, the front camera and/or the rear camera may receive external multimedia data. Each of the front camera and the rear camera can be a fixed optical lens system or have focal length and optical zooming capabilities.

The audio component 1205 is configured to output and/or input audio signals. For example, the audio component 1005 includes a microphone (MIC). When the apparatus 120 is in an operation mode, such as a call mode, a recording mode, and a voice recognition mode, the microphone is configured to receive an external audio signal. The received audio signal may be further stored in the memory 1202 or sent via the communication component 1208. In some embodiments, the audio component 1005 further includes a speaker for outputting audio signals.

The I/O interface 1202 provides an interface between the processing component 1201 and a peripheral interface module. The peripheral interface module may be a keyboard, a click wheel, or a button. These buttons may include, but are not limited to, a home button, a volume button, a start button, and a lock button.

The sensor assembly 1207 includes one or more sensors for providing the apparatus 120 with status assessments in various aspects. For example, the sensor component 1207 can detect the on/off state of the apparatus 120, and the relative positioning of the components. For example, the component is a display and a keypad of the apparatus 120, and the sensor component 1207 can also detect the position change of the apparatus 120 or one component of the apparatus 120, the presence or absence of user contacting with the apparatus 120, the orientation or acceleration/deceleration of the apparatus 120 and the temperature change of the apparatus 120. The sensor assembly 1207 may include a proximity sensor configured to detect the presence of nearby objects without any physical contact. The sensor assembly 1207 may also include a light sensor, such as a CMOS or CCD image sensor, for use in imaging applications. In some embodiments, the sensor assembly 1207 may further include an acceleration sensor, a gyro sensor, a magnetic sensor, a pressure sensor, or a temperature sensor.

The communication component 1208 is configured to facilitate wired or wireless communication between the apparatus 120 and other devices. The apparatus 120 may access a wireless network based on a communication standard, such as Wi-Fi, 2G, 3G, 4G, or 5G, or a combination thereof. In some embodiments, the communication component 1208 receives a broadcast signal from an external broadcast management system or broadcasts related information via a broadcast channel. In some embodiments, the communication component 1208 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology, and other technologies.

In some embodiments, the apparatus 120 may be implemented by one or more application specific integrated circuits (ASICs), digital signal processors (DSPs), digital signal processing devices (DSPDs), programmable logic devices (PLDs), field programmable gate array (FPGA), controller, microcontroller, microprocessor or other electronic component to perform the above method.

In some embodiments, a non-transitory computer-readable storage medium including instructions is also provided, for example, a memory 1202 including instructions, which can be executed by the processor 1209 of the apparatus 120 to complete the above method. For example, the non-transitory computer-readable storage medium may be ROM, random access memory (RAM), CD-ROM, magnetic tape, floppy disk, optical data storage device, or the like.

When the instructions in the storage medium are executed by the processor, the apparatus 120 can perform a method for enabling a smart device to access a network, which includes:

receiving a first identification broadcast by the smart device, wherein the first identification is used to describe uniqueness of the smart device;

in response to the first identification is matched with a smart device identification which is stored, determining that the smart device is a target device; and establishing a communication connection with the smart device, and sending network configuration information to the smart device, so that the smart device accesses the network according to the network configuration information.

Figure 13:
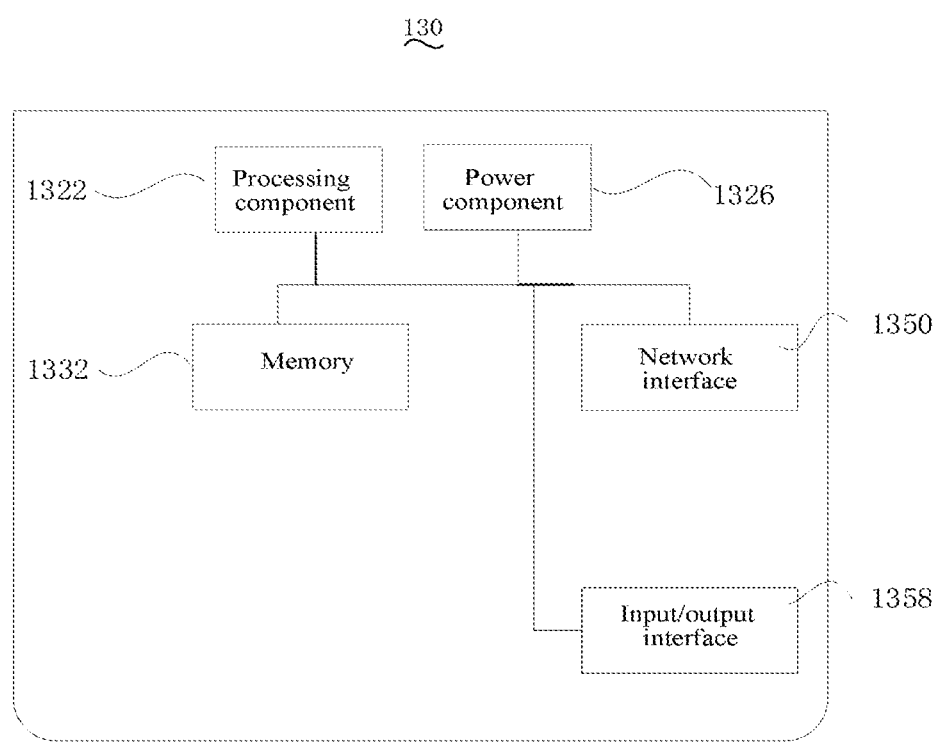
FIG. 13 is a schematic structural diagram of a computer device according to some embodiments.

FIG. 13 is a schematic structural diagram of a computer device shown in some embodiments of the present disclosure. As shown in FIG. 13, an apparatus 130 for enabling a smart device to access a network is shown according to some embodiments. For example, the apparatus 130 may be provided as an electronic device, for example, a server of an online shopping system. Referring to FIG. 13, the apparatus 130 includes a processing component 1322, which further includes one or more processors, and memory resources represented by the memory 1332. The memory resources are used for storing instructions executable by the processing component 1322, such as application programs. The application programs stored in the memory 1332 may include one or more modules each corresponding to a set of instructions. In addition, the processing component 1322 is configured to execute instructions to perform the above-mentioned method for enabling the smart device of the server of the online shopping system to access the network.

The apparatus 130 may also include a power component 1326 configured to perform power management of the apparatus 130, a wired or wireless network interface 1350 configured to connect the apparatus 130 to the network, and an input output (I/O) interface 1358. The apparatus 130 may operate based on an operating system stored in the memory

1332, such as Android, IOS, WindowsServer™, Mac OS X™, Unix™, Linux™, FreeBSD™ or the like.

When the instructions in the memory 1332 are executed by the processing component 1322, the apparatus 130 can perform another method for enabling a smart device to access a network, which includes:

based on a purchase order for the smart device submitted by a specified user, determining a smart device identification of the smart device shipped corresponding to the purchase order; and feeding the smart device identification back to a control terminal, wherein the smart device identification is used to describe uniqueness of the smart device.

Figure 14:
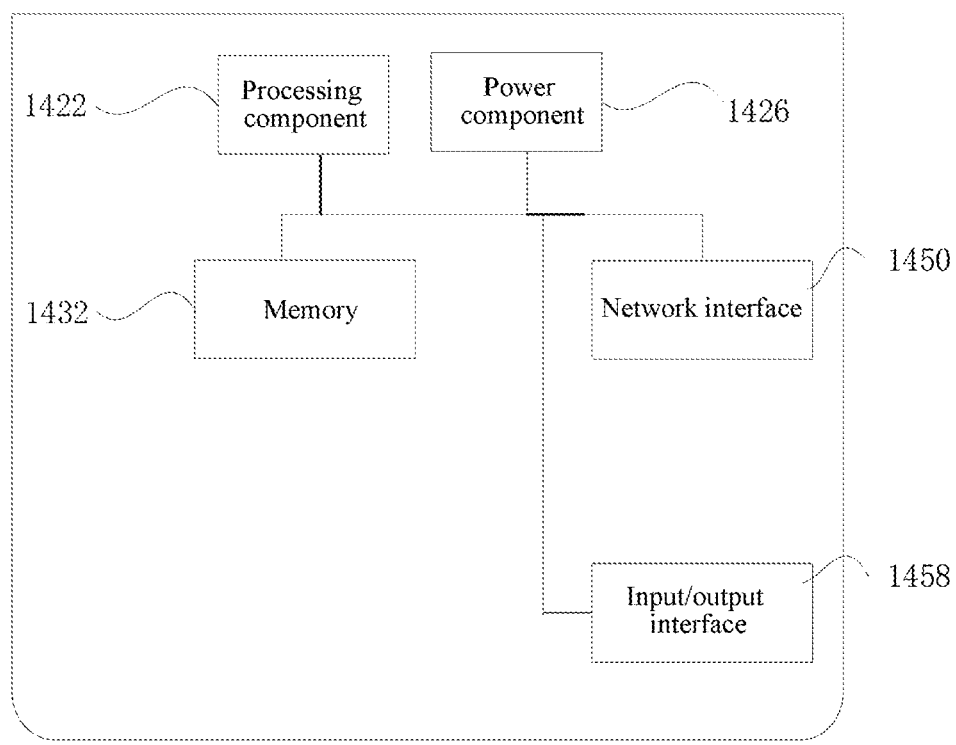
FIG. 14 is a schematic structural diagram of a smart device according to some embodiments.

FIG. 14 is a schematic structural diagram of a smart device shown in some embodiments of the present disclosure. As shown in FIG. 14, a network access apparatus 140 according to some embodiments is shown. For example, the apparatus 140 may be provided as a smart device, for example, a smart home appliance, a smart medical device, a smart car, a smart home device, a smart door lock, etc., which is not specifically limited in this disclosure. Referring to FIG. 14, the apparatus 140 includes a processing component 1422, which further includes one or more processors, and memory resources represented by the memory 1432, for storing instructions executable by the processing component 1422, such as application programs. The application programs stored in the memory 1432 may include one or more modules each corresponding to a set of instructions. In addition, the processing component 1422 is configured to execute instructions to perform the above-described method for enabling the smart device to access the server of the online shopping system.

The apparatus 140 may also include a power component 1426 configured to perform power management of the apparatus 140, a wired or wireless network interface 1450 configured to connect the apparatus 140 to the network, and an input output (I/O) interface 1458. The apparatus 140 can operate based on an operating system stored in the memory 1432, such as Android, IOS, WindowsServer™, Mac OS X™, Unix™, Linux™, FreeBSD™ or the like.

When the instruction in the memory 1432 is executed by the processing component 1422, the apparatus 140 is capable to perform another method for enabling a smart device to access a network. The method includes broadcasting a first identification, so that after receiving the first identification, a control terminal determines that the smart device is a target device in response to the first identification is matched with stored smart device identification, wherein the first identification is used to describe uniqueness of the smart device;

establishing a communication connection with the control terminal, and receiving network configuration information sent by the control terminal; and accessing a network according to the network configuration information.

An embodiment of the present disclosure provides a computer-readable storage medium having a computer program stored thereon, and when the program is executed by a processor, the following steps are realized:

receiving a first identification broadcast by the smart device, wherein the first identification is used to describe uniqueness of the smart device;

in response to the first identification is matched with a smart device identification which is stored, determining that the smart device is a target device; and establishing a communication connection with the smart device, and sending network configuration information to the smart device, so that the smart device accesses the network according to the network configuration information, or based on a purchase order for the smart device submitted by a specified user, determining a smart device identification of the smart device shipped corresponding to the purchase order; and feeding the smart device identification back to a control terminal, wherein the smart device identification is used to describe uniqueness of the smart device, or broadcasting a first identification, so that after receiving the first identification, a control terminal determines that the smart device is a target device in response to the first identification is matched with stored smart device identification, wherein the first identification is used to describe uniqueness of the smart device;

establishing a communication connection with the control terminal, and receiving network configuration information sent by the control terminal; and accessing a network according to the network configuration information.

As for the apparatus embodiments, since they basically correspond to the method embodiments, the relevant parts can be referred to the description of the method embodiments. The apparatus embodiments described above are only schematic, wherein the modules described as separate components may or may not be physically separated, and the components displayed as modules may or may not be physical modules, that is, may be located in one place, or can be distributed to multiple network modules. Some or all of the modules may be selected according to actual needs to achieve the objectives of the disclosed solutions. Those of ordinary skill in the art can understand and implement the present disclosure without paying creative labor.

In some embodiments, before receiving the first identification broadcast by the smart device, the method further includes:

receiving and storing the smart device identification fed back by a server.

In some embodiments, the server is a server of an online shopping system, and the smart device identification is fed back by the server after a designated user submits a purchase order for the smart device.

In some embodiments, receiving the smart device identification fed back by the server in one way of followings:

receiving the smart device identification sent through a second identification by the server; or downloading the smart device identification from a cloud service device, said smart device identification is uploaded to the cloud service device through the second identification by the server;

wherein the second identification is used to describe uniqueness of a home subscriber of the control terminal.

In some embodiments, the second identification is sent to the server by the designated user submitting the purchase order for the smart device, so that after acquiring the second identification, the server feeds the smart device identification back to the control terminal.

In some embodiments, the method further includes:

receiving a third identification sent through the second identification by the server to determine that an object to which the smart device identification is sent by the server is the control terminal itself, wherein the third identification is sent to the server when the designated user submits the purchase order for the smart device, and the third identification is used to describe uniqueness of the control terminal.

In some embodiments, before determining the smart device shipped corresponding to the purchase order, the method further includes:

receiving a second identification sent by the designated user, wherein the second identification is used to describe uniqueness of a home subscriber of the control terminal;

wherein a step of feeding the smart device identification back to the control terminal includes:

feeding the smart device identification back to the control terminal through the second identification.

In some embodiments, before determining the smart device shipped corresponding to the purchase order, the method further comprising:

receiving a third identification sent by the designated user, wherein the third identification is used to describe uniqueness of the control terminal;

wherein a step of feeding the smart device identification back to the control terminal comprising:

feeding the smart device identification and the third identification back to the control terminal through the second identification.

In some embodiments, before feeding the smart device identification back to the control terminal, the method includes:

in response to receiving network configuration information sent by the designated user, sending a write signal, and the write signal is used to notify writing of the network configuration information to the smart device; and in response to not receiving network configuration information sent by the designated user, performing a step of feeding the smart device identification back to the control terminal.

In some embodiments, before broadcasting the first identification, the network access method further includes:

detecting whether the network configuration information is stored;

in response to detecting that the network configuration information is stored, accessing a network according to stored network configuration information; in response to detecting that the network configuration information is not stored, performing a step of broadcasting the first identification.

In some embodiments, the receiving module is further configured to receive and store the smart device identification fed back by a server before receiving the first identification broadcast by the smart device.

In some embodiments, the server is a server of an online shopping system, and the smart device identification is fed back by the server after a designated user submits a purchase order for the smart device.

In some embodiments, the receiving module receiving the smart device identification fed back by the server in one way of followings:

receiving the smart device identification sent through a second identification by the server; or downloading the smart device identification from a cloud service device, said smart device identification is uploaded to the cloud service device through the second identification by the server;

wherein the second identification is used to describe uniqueness of a home subscriber of the control terminal.

In some embodiments, the second identification is sent to the server by the designated user submitting the purchase order for the smart device, so that after acquiring the second identification, the server feeds the smart device identification back to the control terminal.

In some embodiments, the receiving module is further configured to receive a third identification sent through the second identification by the server, to determine that an object to which the smart device identification is sent by the server is the control terminal itself, wherein the third identification is sent to the server when the designated user submits the purchase order for the smart device, and the third identification is used to describe uniqueness of the control terminal.

In some embodiments, the apparatus further includes a receiving module, configured to receive a second identification sent by the designated user before determining the smart device shipped corresponding to the purchase order, wherein the second identification is used to describe uniqueness of a home subscriber of the control terminal;

wherein the feedback module is configured to feed the smart device identification back to the control terminal through the second identification.

In some embodiments, the receiving module is further configured to receive a third identification sent by the designated user before determining the smart device shipped corresponding to the purchase order, wherein the third identification is used to describe uniqueness of the control terminal;

the feedback module is configured to feed the smart device identification and the third identification back to the control terminal through the second identification.

In some embodiments, the apparatus further comprises a sending module, the sending module is configured to before feeding the smart device identification back to the control terminal, send a write signal in response to receiving network configuration information sent by the designated user, and the write signal is used to notify writing of the network configuration information to the smart device;

the feedback module is configured to perform a step of feeding the smart device identification back to the control terminal, in response to not receiving network configuration information sent by the designated user.

Various embodiments of the present disclosure can have one or more of the following advantages.

When the smart device is powered on at the first time, it broadcasts the first identification describing its uniqueness based on a broadcast protocol. After receiving the first identification of the smart device, the control terminal can make a match of the first identification and the stored smart device identifications to determine whether the smart device is a target device, wherein the first identification is used to describe the uniqueness of the smart device. When it is determined that the smart device is the target device by matching, the control terminal establishes a communication connection with the smart device and sends network configuration information to the smart device, so that the smart device automatically accesses the network according to the network configuration information after receiving the network configuration information. In this way, when the smart device is powered on, the control terminal automatically sends the network configuration information to the smart device after determining that the smart device is the target device. The smart device accesses the network according to the received network configuration information, and the entire process does not require manual operations by the user, which is faster and more convenient.

The various device components, modules, units, blocks, or portions may have modular configurations, or are composed of discrete components, but nonetheless can be referred to as "modules" in general. In other words, the "components," "modules," "blocks," "Portions," or "units"

referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for enabling a smart device to access a network, applied to a control terminal, comprising:
receiving and storing the smart device identification fed back by a server, wherein the server is a server of an online shopping system, and the smart device identification is fed back by the server when a designated user submits a purchase order for the smart device;
in response to that the smart device is powered on for a first time, receiving a first identification broadcast by the smart device, wherein the first identification is used to describe uniqueness of the smart device;
in response to that the first identification is matched with the smart device identification which is stored, determining that the smart device is a target device; and
establishing a communication connection with the smart device, and sending pre-stored network configuration information to the smart device, such that the smart device accesses the network according to the network configuration information.

2. The method according to claim 1, wherein the receiving the smart device identification fed back by the server comprises at least one of:
receiving the smart device identification sent through a second identification by the server; or
downloading the smart device identification from a cloud service device, said smart device identification is uploaded to the cloud service device through the second identification by the server;
wherein the second identification is used to describe uniqueness of a home subscriber of the control terminal.

3. The method according to claim 2, wherein the second identification is sent to the server by the designated user submitting the purchase order for the smart device, so that after acquiring the second identification, the server feeds the smart device identification back to the control terminal.

4. The method according to claim 2, further comprising:
receiving a third identification sent through the second identification by the server to determine that an object to which the smart device identification is sent by the server is the control terminal itself,
wherein the third identification is sent to the server when the designated user submits the purchase order for the smart device, and the third identification is used to describe uniqueness of the control terminal.

5. A method for enabling a smart device to access a network applied to a server of an online shopping system, comprising:
based on a purchase order for the smart device submitted by a specified user, determining a smart device identification of the smart device shipped corresponding to the purchase order; and
feeding the smart device identification back to a control terminal, so that the control terminal in response to that a first identification received in response to that the smart device is powered on for a first time is matched with the smart device identification which is stored, determines that the smart device is a target device; and establishes a communication connection with the smart device, and send pre-stored network configuration information to the smart device, such that the smart device accesses the network according to the network configuration information, wherein the smart device identification is used to describe uniqueness of the smart device.

6. The method according to claim 5, wherein prior to the determining the smart device identification of the smart device shipped corresponding to the purchase order, the method further comprising:
receiving a second identification sent by the designated user, wherein the second identification is used to describe uniqueness of a home subscriber of the control terminal;
wherein the feeding the smart device identification back to the control terminal comprises:
feeding the smart device identification back to the control terminal through the second identification.

7. The method according to claim 6, wherein prior to the determining the smart device identification of the smart device shipped corresponding to the purchase order, the method further comprises:
receiving a third identification sent by the designated user, wherein the third identification is used to describe uniqueness of the control terminal;
wherein the feeding the smart device identification back to the control terminal comprises:
feeding the smart device identification and the third identification back to the control terminal through the second identification.

8. The method according to claim 5, wherein prior to the feeding the smart device identification back to the control terminal, the method comprises:
in response to receiving network configuration information sent by the designated user, sending a write signal, wherein the write signal is used to notify writing of the network configuration information to the smart device; and
in response to not receiving network configuration information sent by the designated user, feeding the smart device identification back to the control terminal.

9. A network access method, applied to a smart device, the network access method comprising:
in response to that the smart device is powered on for a first time, broadcasting a first identification, so that after receiving the first identification, a control terminal determines that the smart device is a target device in response to the first identification is matched with stored smart device identification, wherein the first identification is used to describe uniqueness of the smart device, the stored smart device identification is fed back by a server, wherein the server is a server of an online shopping system, and the smart device identification is fed back by the server when a designated user submits a purchase order for the smart device;
establishing a communication connection with the control terminal, and receiving pre-stored network configuration information sent by the control terminal; and
accessing a network according to the network configuration information.

10. The network access method according to claim 9, wherein prior to the broadcasting the first identification, the network access method further comprising:
detecting whether the network configuration information is stored;
in response to detecting that the network configuration information is stored, accessing a network according to stored network configuration information;

in response to detecting that the network configuration information is not stored, broadcasting the first identification.

11. An apparatus implementing the method of claim 1, the apparatus comprising:
   a processor; and
   a memory device storing instructions for execution by the processor to perform operations of the method.

12. An apparatus implementing the method of claim 5, the apparatus comprising:
   a processor; and
   a memory device storing instructions for execution by the processor to perform operations of the method.

13. The apparatus according to claim 12, wherein the processor is further configured to:
   receive a second identification sent by the designated user before determining the smart device shipped corresponding to the purchase order, wherein the second identification is used to describe uniqueness of a home subscriber of the control terminal;
   feeding the smart device identification back to the control terminal through the second identification.

14. The apparatus according to claim 13, wherein the processor is further configured to:
   receive a third identification sent by the designated user before determining the smart device shipped corresponding to the purchase order, wherein the third identification is used to describe uniqueness of the control terminal;
   feed the smart device identification and the third identification back to the control terminal through the second identification.

15. The apparatus according to claim 13, wherein prior to the feeding the smart device identification back to the control terminal, the processor is further configured to:
   send a write signal in response to receiving network configuration information sent by the designated user, and the write signal is used to notify writing of the network configuration information to the smart device;
   perform feeding the smart device identification back to the control terminal, in response to not receiving network configuration information sent by the designated user.

16. A network access apparatus implementing the method of claim 9, the network access apparatus comprising:
   a processor; and
   a memory device storing instructions for execution by the processor to perform operations of the method;
   wherein the processor is configured to:
   detect whether the network configuration information is stored before broadcasting the first identification;
   access the network according to stored network configuration information in response to detecting that the network configuration information is stored;
   perform broadcasting the first identification in response to detecting that the network configuration information is not stored.

17. A shopping system implementing the method of claim 1, comprising the smart device, and the control terminal; wherein:
   the control terminal is configured to, after receiving the first identification of the smart device, make a match of the first identification and stored smart device identifications to determine whether the smart device is a target device;
   the first identification is used to describe the uniqueness of the smart device;
   upon it is determined that the smart device is the target device by matching, the control terminal is configured to establish a communication connection with the smart device and automatically send pre-stored network configuration information to the smart device, such that the smart device automatically accesses the network according to the network configuration information after receiving the pre-stored network configuration information without manual operations by the user.

* * * * *